J. C. MERRITT.
Washing-Machine.
No. 215,145.   Patented May 6, 1879.
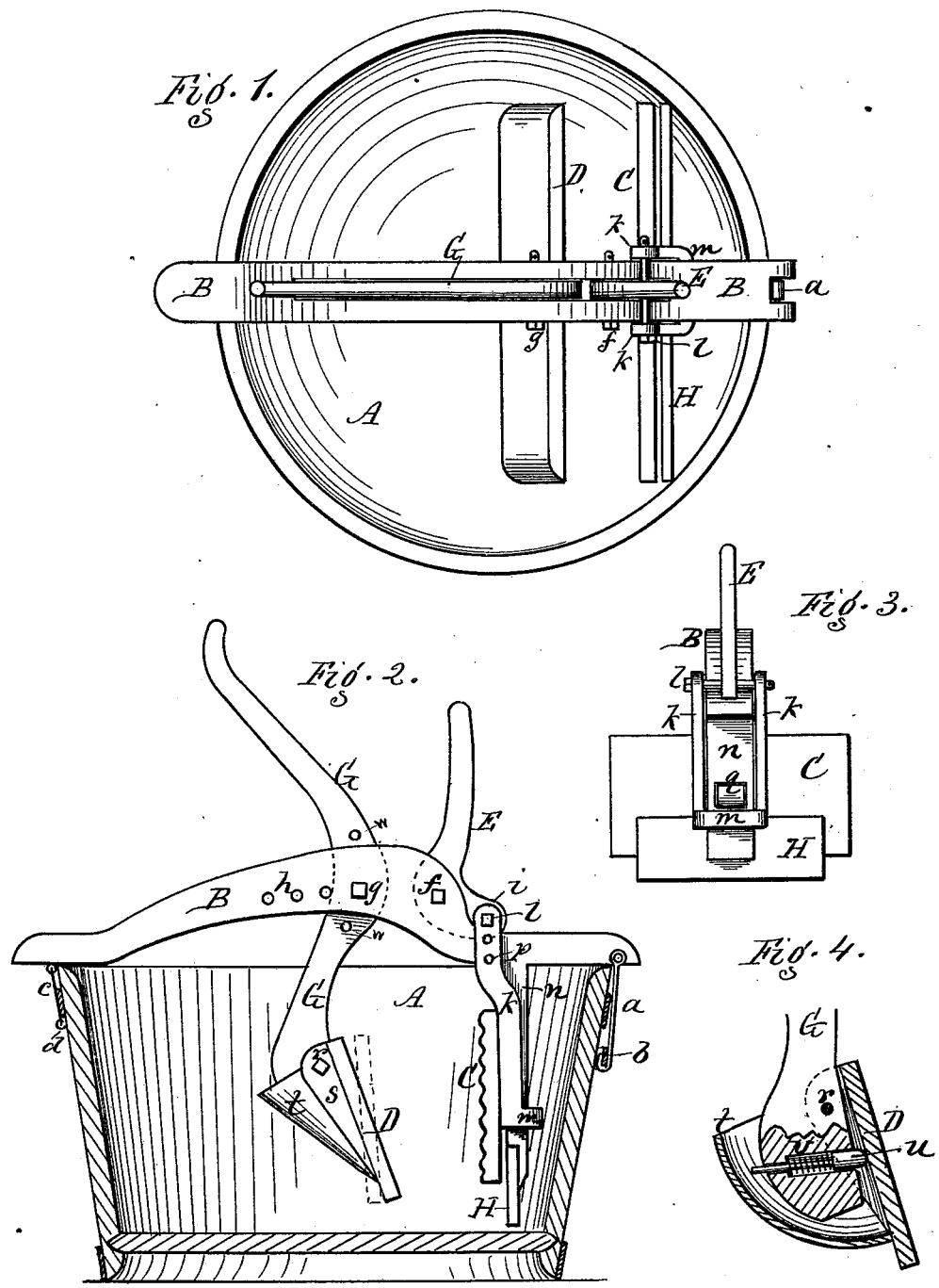

UNITED STATES PATENT OFFICE.

JAMES C. MERRITT, OF WARSAW, NEW YORK.

IMPROVEMENT IN WASHING-MACHINES.

Specification forming part of Letters Patent No. 215,145, dated May 6, 1879; application filed March 14, 1879.

*To all whom it may concern:*

Be it known that I, JAMES C. MERRITT, of Warsaw, Wyoming county, New York, have invented a certain new and useful Improvement in Washing-Machines; and I do hereby declare that the following is a full, clear, and exact description of the same, reference being had to the accompanying drawings, in which—

Figure 1 is a plan of my improvement attached to a tub. Fig. 2 is a sectional elevation. Fig. 3 is a rear view of the bed and its connections. Fig. 4 is a detail view.

My improvement relates to washing-machines in which the clothes are washed by being compressed between a reciprocating rubber-board and a bed.

The invention consists in the construction and arrangement of parts, hereinafter more fully described.

A represents an ordinary wash-tub. B is a supporting-bar resting across the top of the tub, and forming the frame for the washing apparatus. This bar is attached to the tub, on one side, by a hinged latch, $a$, having a hook end at its bottom, which catches under a plate, $b$, attached to the tub; or the latch may be made long enough to extend down and catch under the bottom of the tub. The opposite end of the bar has a simple hook, $c$, which engages with an eye, $d$, screwed into the side of the tub.

C is the bed-plate, and D the rubber, which form the washing apparatus. These are both attached to hand-levers E G, pivoted at $f$ $g$ in the cross-bar, said levers extending up through a slot of the cross-bar, and projecting such a distance above as to be easily operated by the hands. The lever E stands nearly upright, while G inclines backward to give room for the operation of the parts.

The pivot $g$ of lever G can be changed forward or back in a series of holes, $h$ $h$, in the cross-bar, to give more or less space between the rubber and the bed to accommodate a larger or smaller quantity of clothes.

The outer end of lever E is cranked, as shown at $i$, and the bed-plate C is connected with the cranked end by two vertical arms, $k$ $k$, of the bed, which extend up, embracing the cross-bar, and are pivoted at $l$ to said cranked end. At the lower end of the two arms $k$ $k$ is a loop or guide, $m$, which embraces a stiff bar, $n$, that projects downward from the cross-bar, as shown in Fig. 2.

By this means it will be seen that when lever E is operated the bed-plate C will be reciprocated up and down, and the arms $k$ $k$ and loop $m$, riding against the stiff bar $n$, will form a guide to keep the bed from twisting or turning, and will always retain it in place.

H is a rigid cross-board attached to the lower end of bar $n$, extending across the tub, resting near its bottom, and serving as a stop to prevent the clothes being driven under the bed by the rubber as the bed rises and falls.

The arms $k$ $k$ have a series of adjusting-holes, $p$ $p$, through which the pivot $l$ passes, by which means the bed may be adjusted higher or lower at pleasure.

A roller, $q$, is preferably inserted in the vertical bar $n$, against which the bed C bears in its up-and-down movements to relieve the friction.

The rubber D has lugs $s$ on its back side, which are pivoted at $r$ to the lower end of lever G, so that said rubber has a turning movement on the lever. On the back side of said lugs is a shield, $t$, which incloses and covers the lower end of the lever. In the lower end of the lever is a pin, $u$, seated in a socket of the lever and pressed out by a coiled spring, $v$, so as to cause the head of the pin to bear against the back of the rubber nearly at right angles and some distance below the pivot $r$. By this means it will be seen that the rubber can yield back at the bottom.

The operation is as follows: The clothes are placed between the rubber D and bed-plate C, and the rubber is worked forward and back, which causes the water to alternately pass forward and back through the clothes. At the same time, or at intervals, the bed C is also worked up and down vertically, which produces a rubbing action on the clothes. These actions may be alternated as desired, so that combined pressing and rubbing actions are produced, which are effective in removing dirt.

The operator holds the two levers E G in both hands, so that the machine is under perfect control. The stationary board H, resting close behind the vertically-acting bed and extending below the same, effectually prevents the clothes from being pressed under the bed and interfering with the action. The pivoted rubber allows free movement of the same, and the spring resting against it causes the bottom of the rubber to close up toward the bed, thereby gathering and raising the clothes as they are compressed, and preventing their settling in a body at the bottom. In the back movement, also, the bottom of the rubber yields and prevents the splashing of the water over the tub, which would occur if the rubber was stiff. The spring, instead of being of the form shown, may be of any other by which the same effect is accomplished.

The bed may be corrugated longitudinally, and the rubber be provided with holes extending partially or wholly through the same, or be arranged in any desired manner.

w w are adjusting-holes in lever G, for adjustment up and down.

Having thus described my invention, what I claim as new is—

1. In a washing-machine, the combination of the rubber D, attached to the pivoted handle G, to receive a forward-and-back action, the bed C, attached to the handle E, to receive a vertical up-and-down motion, and the stationary cross-board H, attached to bar n beneath and just behind the bed, as shown and described, and for the purpose specified.

2. In a washing-machine, the combination, with the rubber D and its lever G, pivoted together as described, of the spring-pin u, in the lower end of the lever, bearing against the rubber, and the shield t, inclosing the end of the lever, as shown and described.

In witness whereof I have hereunto signed my name in the presence of two subscribing witnesses.

JAMES C. MERRITT.

Witnesses:
R. F. OSGOOD,
JACOB SPAHN.